US007331858B2

(12) United States Patent
McComb et al.

(10) Patent No.: US 7,331,858 B2
(45) Date of Patent: Feb. 19, 2008

(54) GAMING MACHINE WITH POLYHEDRAL REELS

(75) Inventors: Kevin R. McComb, Chicago, IL (US); Daniel P. Fiden, Chicago, IL (US); Michael P. Casey, Chicago, IL (US); Joel R. Jaffe, Evanston, IL (US)

(73) Assignee: WMS Gaming Inc., Chicago, IL (US)

( * ) Notice: Subject to any disclaimer, the term of this patent is extended or adjusted under 35 U.S.C. 154(b) by 810 days.

(21) Appl. No.: 10/660,321

(22) Filed: Sep. 11, 2003

(65) Prior Publication Data

US 2005/0059454 A1 Mar. 17, 2005

(51) Int. Cl.
*A63F 13/00* (2006.01)
*G06F 19/00* (2006.01)
*G06F 17/00* (2006.01)

(52) U.S. Cl. ............................ 463/16; 463/17; 463/18; 463/20; 463/22; 273/138.1; 273/138.2; 273/143 R; 273/146

(58) Field of Classification Search .................. 463/16, 463/17, 20
See application file for complete search history.

(56) References Cited

U.S. PATENT DOCUMENTS 4,874,173 A 10/1989 Kishishita ............... 273/143 R
5,344,145 A 9/1994 Chadwick et al. ....... 273/138 A
5,584,764 A 12/1996 Inoue .......................... 463/20
5,609,524 A 3/1997 Inoue .......................... 463/20
6,008,784 A 12/1999 Acres et al. .................. 345/82
6,093,102 A * 7/2000 Bennett ........................ 463/20
6,338,678 B1 1/2002 Seelig et al. .................. 463/17
6,413,162 B1 7/2002 Baerlocher et al. ........... 463/20
6,537,152 B2 3/2003 Seelig et al. .................. 463/30
6,582,307 B2 6/2003 Webb .......................... 463/22
6,605,000 B2 8/2003 Adams ......................... 463/20
6,644,664 B2 * 11/2003 Muir et al. ................. 273/146
2001/0016513 A1 8/2001 Muir et al. .................... 463/16
2002/0094861 A1 7/2002 Seeling et al. ................ 463/20
2002/0107066 A1 8/2002 Seeling et al. ................ 463/20
2003/0040358 A1 2/2003 Rothkranz et al. ............ 463/20
2003/0060269 A1 3/2003 Paulsen et al. ............... 463/20
2003/0064790 A1 4/2003 Hughs-Baird et al. ......... 463/20
2003/0069066 A1 4/2003 Seeling et al. ................ 463/20

* cited by examiner

*Primary Examiner*—John Hotaling
*Assistant Examiner*—Paul A. D'Agostino
(74) *Attorney, Agent, or Firm*—Nixon Peabody LLP

(57) ABSTRACT

A gaming machine with an improved game display is disclosed. Polyhedral reel strips are used in a gaming machine to present game outcomes in configurations previously not practicable. In addition, the polyhedral reels provide a game display that is more easily readable than can be obtained from the traditional mechanical circular reel.

19 Claims, 18 Drawing Sheets

GAMING MACHINE WITH POLYHEDRAL REELS

FIELD OF THE INVENTION

The present invention relates generally to gaming machines and, more particularly, to a method and apparatus for using polyhedral reels in a gaming machine.

BACKGROUND OF THE INVENTION

Gaming machines, such as slot machines, video gaming machines and the like, have been cornerstones of the gaming industry for many years. A gaming machine conducts a wagering game in which a random outcome is determined and displayed to a player. The random outcomes selected are determined by a random number generator and a probability table that include all possible game outcomes. The player receives an award if the game outcome is listed on the pay table; otherwise, the player loses his wager. One type of gaming machine uses arrays of symbols to show the game outcome to the player. Mechanical slots or video gaming machines typically exemplify these gaming machines. For each spin, circular reels are rotated and stopped to randomly place the symbols on the reels in visual association with a display area.

Electromechanical gaming machines later supplanted these first mechanical gaming machines. Electromechanical gaming machines use microprocessors to determine a random game outcome. Electric stepper motors individually stop each circular reel in the position determined by the microprocessor.

Generally, the popularity of gaming machines is dependent on the likelihood (or perceived likelihood) of winning money at the machine and the intrinsic entertainment value of the machine. Because the payback percentage that each gaming machine is programmed to provide is tightly controlled by regulatory authorities, the only distinguishing feature is the entertainment value of the gaming machine. Gaming establishments strive to place the most entertaining gaming machines on their casino floors to attract players and increase profitability. In the competitive gaming machine industry, there is a continuing need for gaming machine manufacturers to produce new and more entertaining types of gaming machines.

One concept that has been successfully employed to enhance the entertainment value of the gaming machine is the "bonus" game. The bonus game is usually mounted in a top box cabinet on top of the base game. The bonus game may comprise any type of game, either similar or completely different from the base game, and is generally triggered upon the occurrence of a selected event or outcome in the base game.

The bonus game typically acts as a reward for achieving certain winning outcomes in the base game. The principal difference between the base game and the bonus game is that a wager is required to play the base game. In contrast, a wager is not required to play the bonus game. The player is allowed to collect as many credits as possible in the bonus game until exited from the bonus game. Similar to the base game, the bonus game also employs the random selection of a game outcome. Because the bonus game is an incentive to play the base game in the hope of triggering the bonus game, the bonus game is generally elaborately themed for maximum entertainment value.

Providing an attractive and interesting game display for the gaming machine is one of the most effective methods for enhancing entertainment value. Fanciful and visually appealing displays offer tremendous player appeal. Consequently, any improved game display for the base or bonus game can provide a substantial increase in player entertainment value and an attendant increase in gaming machine revenues for the gaming establishment. Because such games are attractive to both players and operators, there is a continuing need to develop new features that will attract and keep players interested in the gaming machine.

Although many gaming machines in the prior art use electronics and electronic visual displays, few offer electromechanical devices. Players often trust electromechanical gaming machines because they feel the game outcomes are truly random. Many players also prefer an electromechanical gaming machine for its three dimensional visual presentation of the game. What is needed is a new electromechanical apparatus for selecting and presenting game outcomes to players on a more entertaining and interesting game display.

SUMMARY OF THE INVENTION

Although circular reel strips have long been utilized, more visually interesting entertaining gaming machine displays are needed. To this end, the present invention utilizes polyhedral reels to display game outcomes.

The polyhedral reel is formed from a polyhedron such as a triangular polyhedron (although any type of polyhedron may be used). Each face of the polyhedron has an indicium that helps determine a game outcome. The movement of each polyhedral reel and its stopping position is controlled by the central processing unit of the gaming machine.

The small size of the polyhedral reels, made possible by the limited number of faces of each polyhedron, allows gaming machines to contain many more reels than in a traditional gaming machine. For example, mechanical gaming machines typically have three or four circular reels. In substantially the same volume, nine to twelve separately independently controllable polyhedral reels may be accommodated.

Because each of the polyhedral reels is independently controllable, there is greater game design flexibility. For example, traditional circular reels are limited by the fixed order of the reel symbols (indicia) that appear on each reel. This fixed order significantly limits the design of multiple pay line gaming machines and imposes constraints that affect the game mathematics and the possible outcomes attainable with the game. Polyhedral reels, because of their independent rotation, allow any combination of indicia to be displayed, unfettered by the fixed location of each indicium on the prior art circular reel.

A further advantage of the small size of the polyhedral reels is that the reels can be arranged in any configuration. These configurations may include circular, pyramidal, or rectangular matrix arrays. These various configurations lend themselves to creating entirely new pay lines based on the configuration created by the polyhedral reels.

Another advantage of the polyhedral reels is that their inertial mass may be much less than that of a traditional circular reel. The stepper motor that drives both the traditional circular reel and the polyhedral reel can be adversely affected by large rotational mass moments of inertia, making it difficult to quickly and accurately position the reel. The rotational inertia of the polyhedral reel is minimized because it only displays a single indicium. This allows the stepper motor to quickly reverse rotational direction, as well as allowing the precise positioning of the polyhedral reel when it is stopped.

In addition to the physical advantages of polyhedral reels discussed above, the polyhedral display can provide a much more entertaining visual display because of the visual perception impressed on players by the spinning polyhedral reels. The sharp dividing line between the faces on the polyhedron provides an easily visually perceptible sense of spinning speed that cannot be replicated with a circular reel. The visual perception of the spinning polyhedral reels produces an entertaining visual effect that cannot be duplicated by circular reels.

One of the more interesting visual effects that can be produced by the polyhedral reels is an oscillating movement caused by rapidly changing the polyhedral reels rotational direction. This reversal of directional motion occurs quickly and provides a pleasing aesthetic dynamic to the game display as the polyhedral reels oscillate back-and-forth. Without the small size and low inertial mass of the polyhedral reels, accomplishing this oscillation would be very difficult. Further, even if such oscillatory motion could be achieved with a traditional circular reel, it would not provide the same visual impression because circular reels lack the sharply angled faces of the polyhedral reel, which allow players to visually perceive the motion and rotational direction of the polyhedral reel.

In addition to providing an interesting visual display, polyhedral reels provide a much crisper image than traditional circular reels. Viewing indicia on traditional circular reels is much more difficult because of the distortion induced by the curvature of the circular reel. Indicia toward the top and bottom portions of a reel are more difficult to read as they curve away from the player. The polyhedral reels present the indicia crisply because each reel displays a single indicia flat and flush against the game display. Consequently, the indicium is visible and highly readable by the player, even when oscillating. Further, because of the curvature of the circular reel, some players sometimes have difficulty coordinating the various indicia displayed with their associated pay lines. In contrast, a polyhedral reel assembly lies flat and flush with the game display allowing the player to see the pay lines easily and distinctly.

BRIEF DESCRIPTION OF THE DRAWINGS

The foregoing and other advantages of the invention will become apparent upon reading the following detailed description and referring to the drawings in which.

Figure 1:
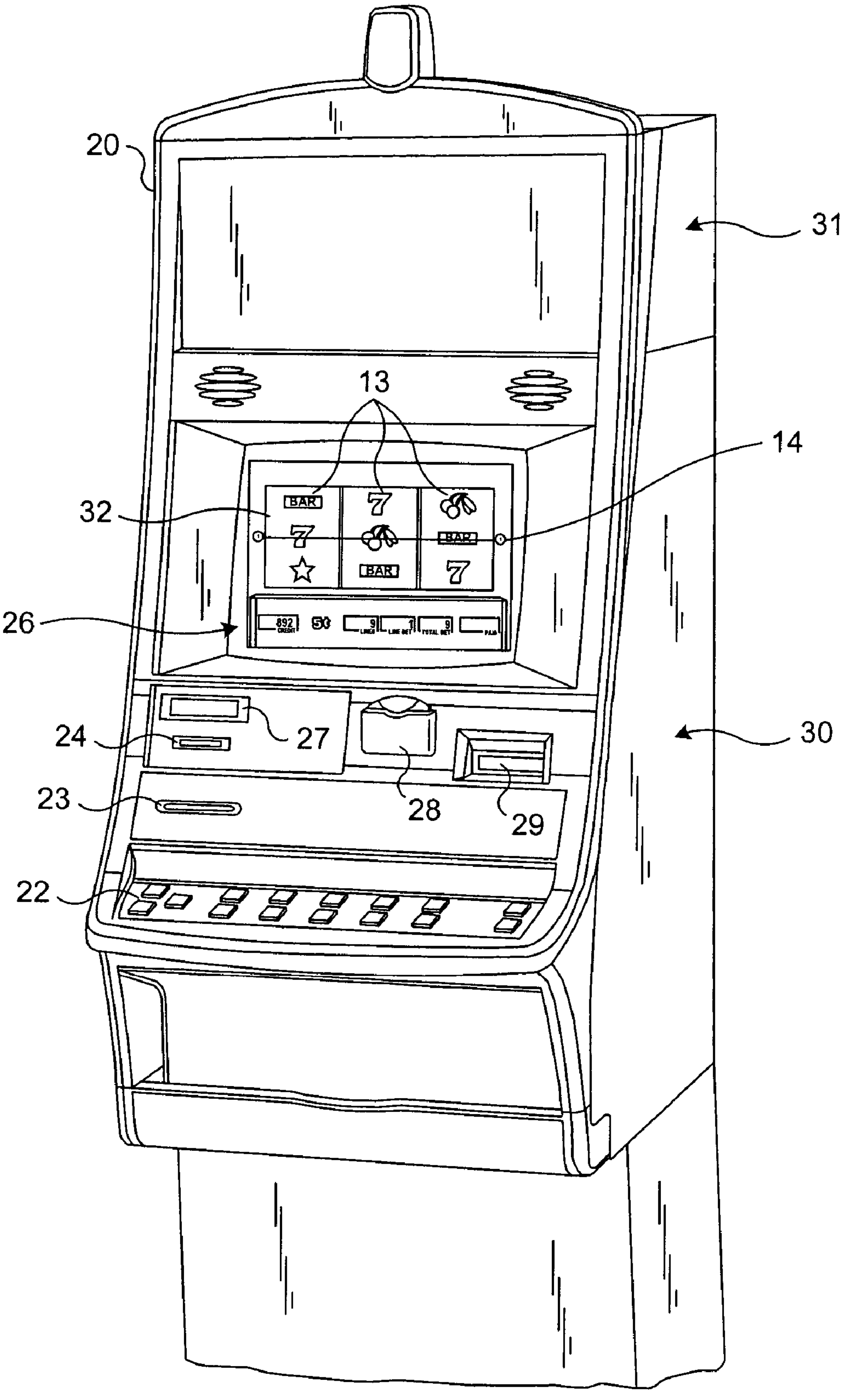
FIG. 1 is a perspective view of a gaming machine.

While the invention is amenable to various modifications and alternative forms, specific embodiments have been shown by way of example in the drawings and will be described in detail herein. It should be understood that the invention is not intended to be limited to the particular forms disclosed. The invention is to cover all modifications, equivalents, and alternatives falling within the spirit and scope of the invention as defined by the appended claims.

DESCRIPTION OF SPECIFIC EMBODIMENTS

The description of the preferred examples is to be construed as exemplary only and does not describe every possible embodiment of the invention. Numerous alternative embodiments could be implemented, using either current technology or technology developed after the filing date of this patent, which would still fall within the scope of the claims defining the invention.

FIG. 1 is a perspective view of a typical gaming machine 20 that may be used in conjunction with the present invention. The gaming machine may have varying structures and methods of operation. Gaming machine 20 may be a mechanical gaming machine configured to play mechanical slots. Similarly, gaming machine 20 may be an electromechanical gaming machine with mechanical reels having an electronically determined game outcome. Alternatively, gaming machine 20 may be entirely electronic and have a game program configured to play a video casino game such as blackjack, slots, keno, bingo, poker, etc. The gaming machine 20 in FIG. 1 is depicted as a prior art three reel electromechanical gaming machine.

Gaming machine 20 shown in FIG. 1 may also include a bonus game that is typically included in a top box cabinet 31. The top box cabinet 31 is attached to the top of the base cabinet 30. Similar to the base game, the bonus game may have mechanical, electromechanical, or electronic game displays.

Gaming machines 20 require a variety of peripheral devices to operate. The principal peripheral components found in gaming machines are described below. It should be understood that many other components and interfaces exist and could be used in any number of combinations to create a variety of gaming machines. The number and type of peripheral devices vary depending upon the options and capabilities desired for any particular gaming machine.

For example, to initiate game play a wager acceptor is used to accept monetary value. The wager acceptor may include a coin slot acceptor 28 or a note acceptor 29 to register monetary value on the gaming machine 20. The wager acceptor may also include any type of cashless gaming system.

Cashless gaming systems have been introduced into many gaming establishments to help alleviate the problems associated with security and the physical transport of currency (especially coins). These systems often rely on ticket printers 23 installed in the gaming machine 20. These ticket printers 23 may be used to print and/or read ticket vouchers, which are encoded with some monetary value. Players typically begin play at a gaming machine by inserting currency. When the player cashes out of the gaming machine, the monetary value remaining on the machine's meters is encoded on a ticket, which is dispensed to the player. This ticket may be taken to a cashier and redeemed for currency. Alternatively, the ticket may be reinserted into a new gaming machine having a ticket reader. The monetary value encoded on the ticket is transferred to that gaming machine, allowing the player to play that game.

Gaming machines are also commonly equipped with a player tracking card reader 24. Players are commonly issued player tracking cards when they join casino loyalty programs. The player tracking card reader is able to identify a player by the membership card, which is inserted into each gaming machine at the start of game play. The player's wagering activity is recorded by a central computer on an account associated with the player tracking card. In return, a player becomes eligible for complimentary items, services, and other special player incentives.

A push button panel 22 is typically offered to allow players to make game selections. A touch screen may be installed over the game display to give players an alternative method for making game selections.

Figure 2:
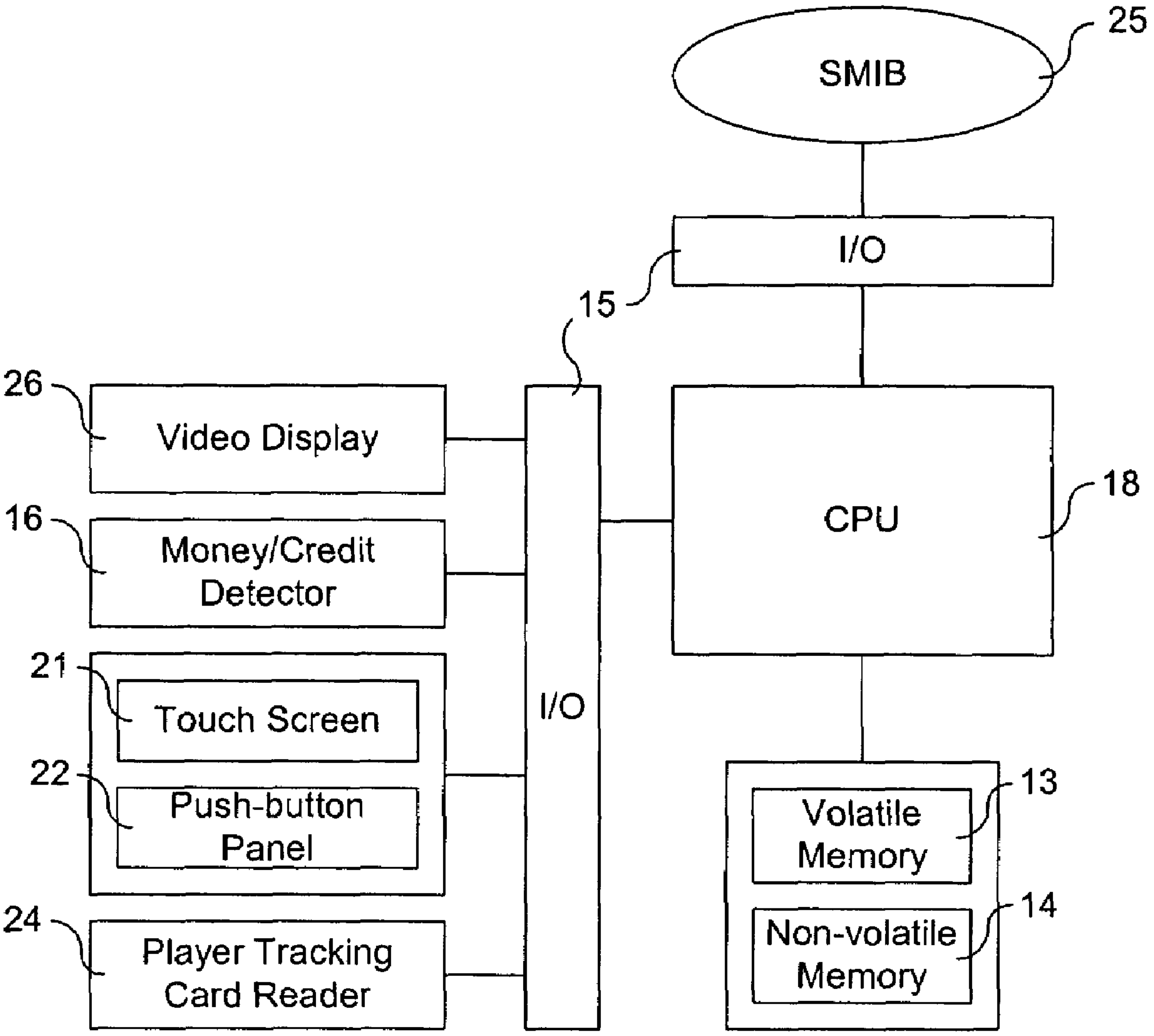
FIG. 2 is a block diagram of a control system suitable for operating the gaming machine in FIG. 1.

The various gaming machine peripheral devices described above are controlled by a central processing unit (CPU) 18 (such as a microprocessor or micro controller) as shown in FIG. 2. The CPU 18 uses a volatile memory 13 (e.g., a random-access memory (RAM)), a non-volatile memory (or static memory) 14 (e.g., an EEPROM), and an input/output (I/O) circuit 15. It should be appreciated that although only one microprocessor is shown, the CPU 18 may include multiple microprocessors and other ancillary electronic components. These components may include video controllers, video RAM, and other miscellaneous controllers and processors. Similarly, the memory of the CPU 18 may include multiple RAM and multiple program memories. Although the I/O circuit 15 may be shown as a single block, the I/O circuit may also include many different types of I/O circuits.

Besides controlling each of the peripheral devices, the CPU also executes and controls the play of the game, as well as determining the game outcome, with a game program stored in memory. In more sophisticated wagering games, the CPU develops the game play through several intermediate game outcomes and eventually determines a final game outcome. Game outcome will be used to refer either to a final game outcome or to an intermediate game outcome. The intermediate game outcome may or may not determine a wager outcome and could include further game play alternatives (e.g., such as free spins, game termination, multipliers, etc.).

The game outcome is displayed to the player on a game display 26, such as a video game display or a mechanical game display. The video game display may be, for example, a cathode ray tube (CRT) or a flat panel display (FPD).

A typical slot game is shown on the game display 26 shown in FIG. 1. Referring to FIG. 1, the base game 32 is implemented on a three reel 13*a, b, c* mechanical game display 26 with a single pay line 14. The pay line 14 extends through one symbol on each of the three reels 13. Other gaming machines exist in the prior art with multiple pay lines that intersect indicia in a variety of other groupings.

Game play is initiated by inserting money or playing credits, causing the CPU to activate a number of pay lines 14 the corresponding to the amount of money or number of credits played. In one embodiment, the player selects the number of pay lines (generally between one and eight pay lines) to play by pressing a "Select Lines" button on the game machine 20. To bet on the selected pay lines the player chooses the number of coins or credits by pressing the "Bet Per Line" button. After activation of the pay lines, the reels 13 may be set in motion by touching the "Spin Reels" button. Other mechanisms such as, a lever, or push button may also be used to set the reels in motion.

The CPU uses a random number generator to select a game outcome for the base game. The random number generated is compared with a probability table to determine the corresponding game outcome. For a slot type gaming machine the random number generator corresponds to a particular set of reel "stop positions." The CPU then causes each of the mechanical reels 13 to stop at the appropriate stop position.

Winning base game outcomes (e.g., symbol combinations resulting in payment of coins or credits) are identifiable to the player by a pay table. A winning base game outcome occurs when the symbols appearing on the reels 13*a, b, c* along an active pay line corresponds to a winning combination on the pay table. A winning combination, for example, could be three or more matching symbols along an active pay line, where the award is greater as the number of matching symbols increases along the active pay line. If the displayed symbols stop in a winning combination, the game credits the player an amount corresponding to the award in the pay table for that combination multiplied by the amount of credits bet on the winning pay line.

Figure 9:
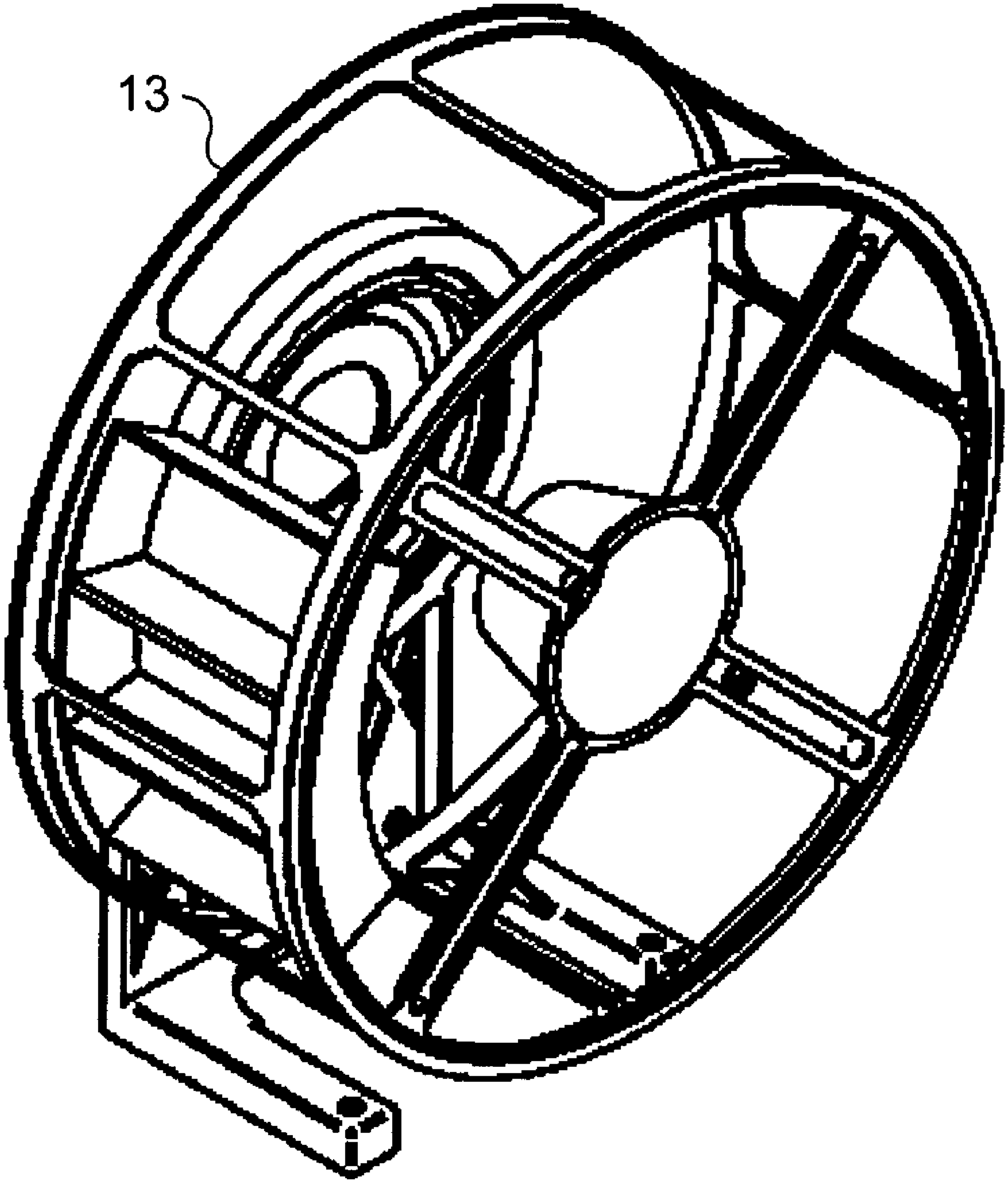
FIG. 9 (Prior Art)
FIG. 9 is a prior art circular reel assembly.

Unlike the traditional prior art circular reels shown in FIG. 9, a polyhedral reel may be used to display game indicia. The polyhedral reel assembly is illustrated in FIGS. 3-6.

Figure 3:
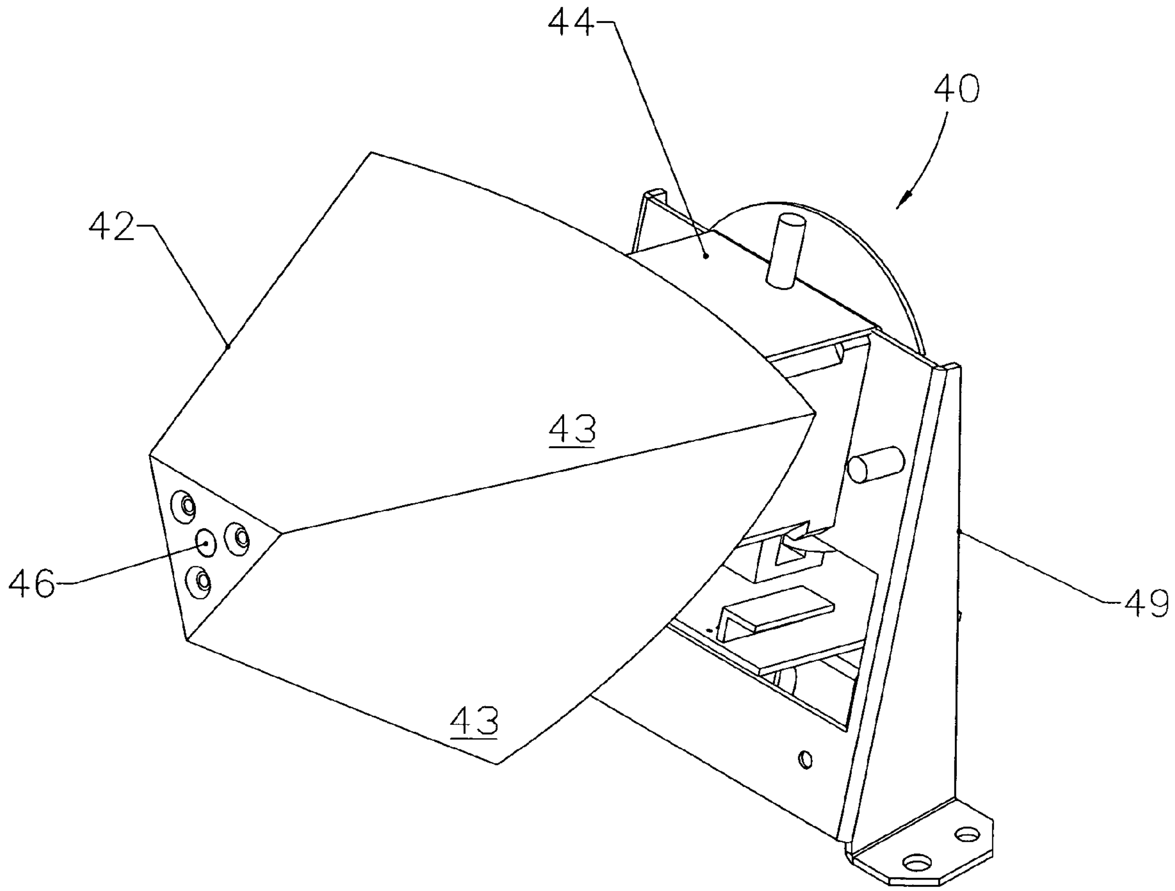
FIG. 3 is an isometric view of a polyhedral reel assembly.
Figure 4:
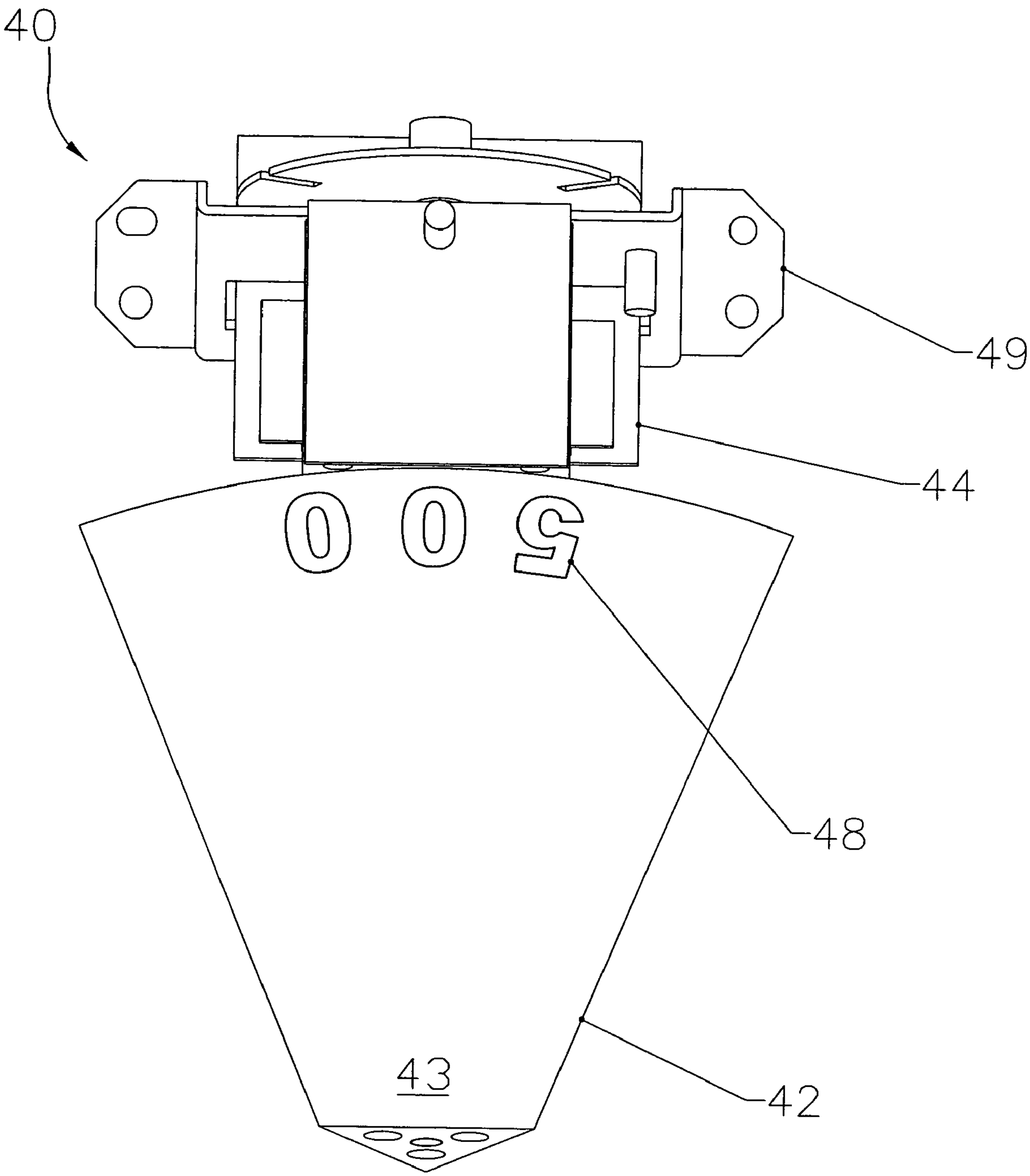
FIG. 4 is a top orthogonal view of the polyhedral reel assembly shown in FIG. 3.
Figure 5:
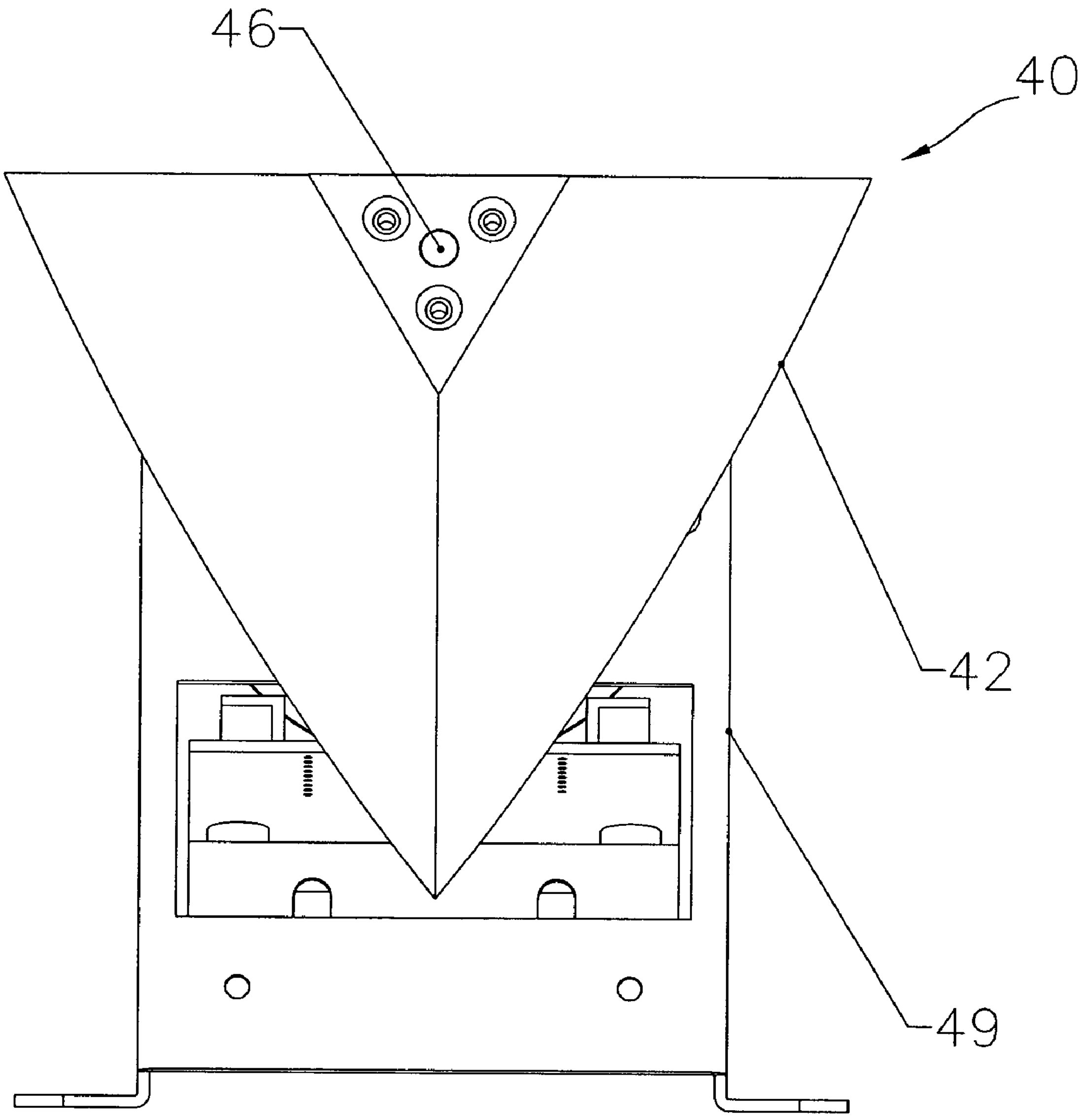
FIG. 5 is a front orthogonal view of the polyhedral reel assembly shown in FIG. 3.
Figure 6:
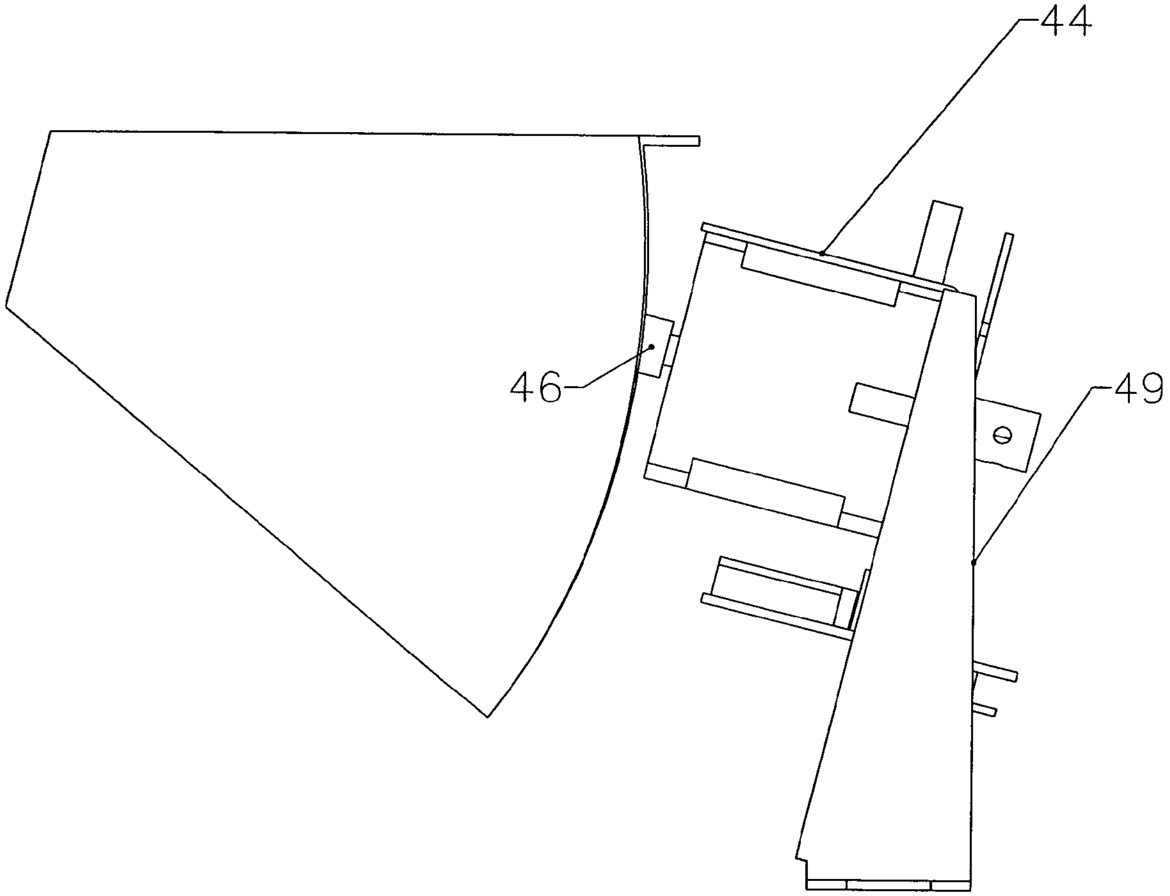
FIG. 6 is a side orthogonal view of the polyhedral reel assembly shown in FIG. 3.

The polyhedral reel 42 is driven by a stepper motor 44 through a drive shaft 46 as shown in FIG. 3. The polyhedral reels may contain any number of faces 43. Generally, however, the best visual effects are obtained using a smaller number of polyhedral faces 43. Usually, each face 43 of the polyhedral reel 42 will have some form of indicia 48. It is also possible that a face 43 will be blank, neutral, null, or void. Still other indicia may indicate some form of information relating to the play of the game.

In accordance with the present invention, the polyhedral reels may be used in a number of different ways. The polyhedral reels may be used to replace, or used in addition to, the traditional circular reel depicted in FIG. 9. The polyhedral reels may also be used in a bonus game where their outcome is not associated with pay lines.

Figure 10:
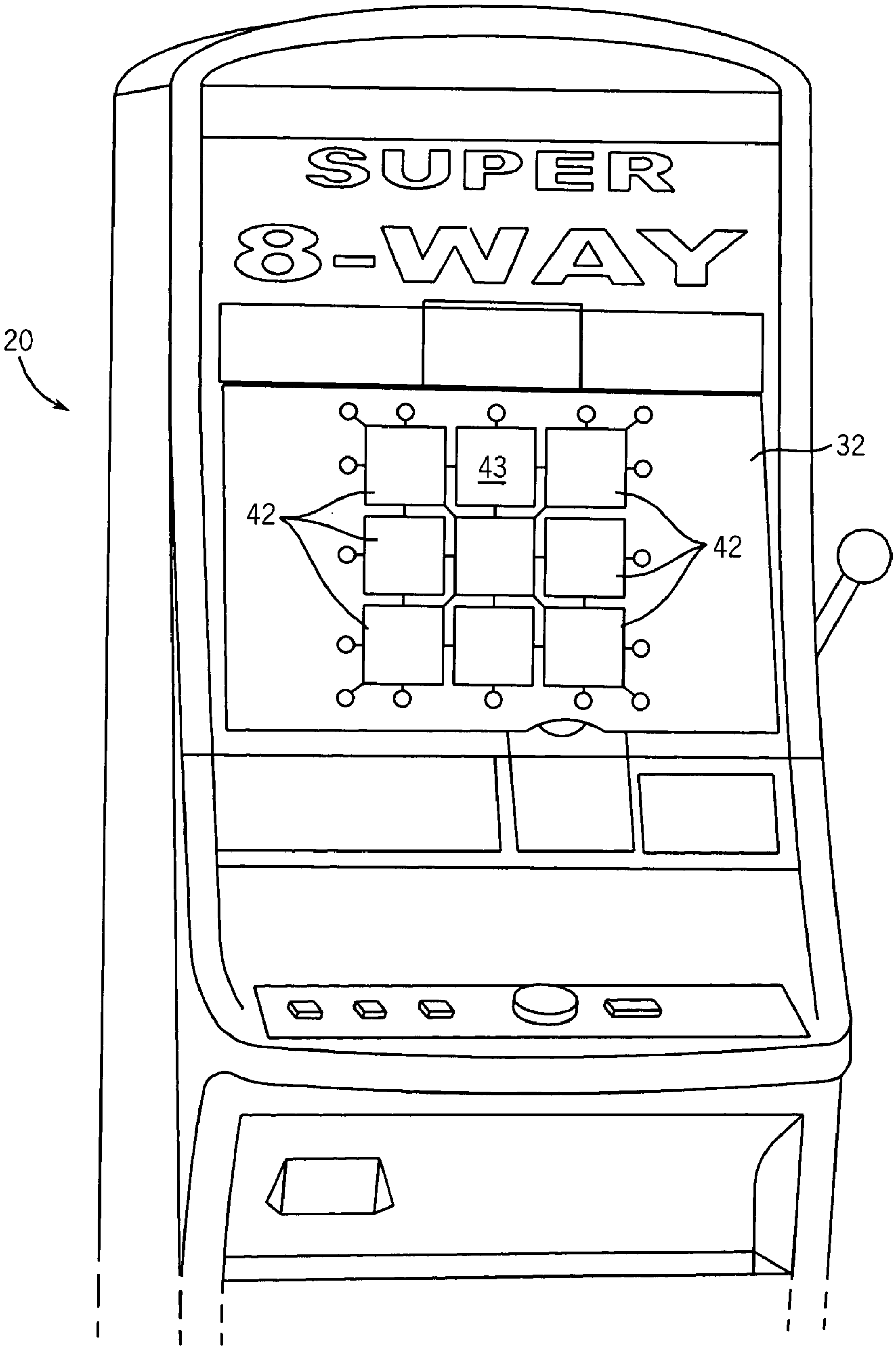
FIG. 10 is a gaming machine with four sided polyhedral reels.

FIG. 10 illustrates a gaming machine 20 having a base game having four faced polyhedral reels 42 in a base game 32. These four-faced reels are otherwise similar to the triangular polyhedral reels illustrated in FIG. 3. If desired, the polyhedral reel assemblies 40 could be any numbers of other types of polyhedrons. The indicia 48 function as reel symbols to determine a game outcome. These reel symbols may be any type, including traditional reel symbols such as fruit, bars, and blank symbols.

Figure 11:
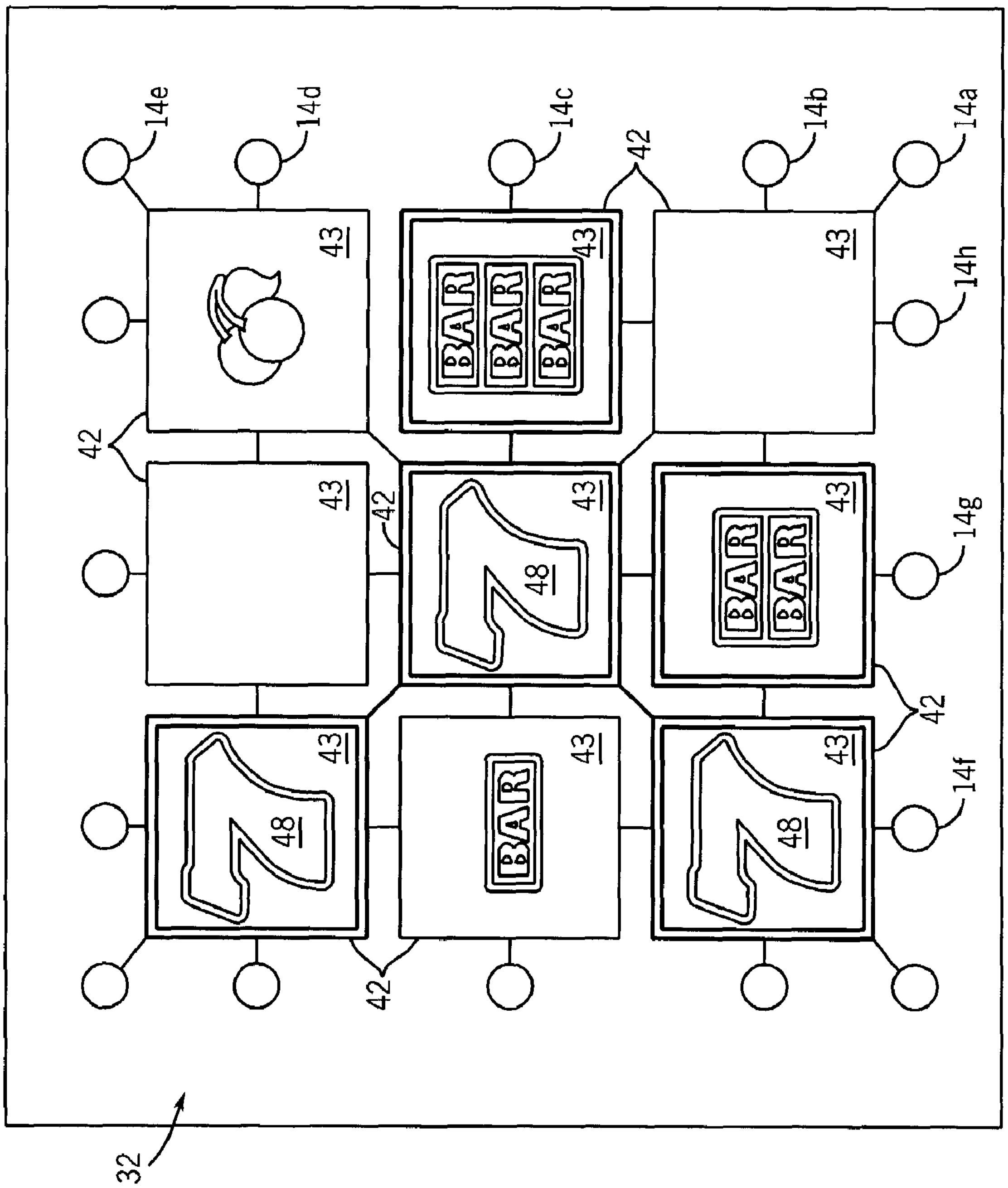
FIG. 11 is the game display of the gaming machine shown in FIG. 10.

FIG. 11 illustrates the base game 32 shown in FIG. 10 with a plurality of reels 42. In the base game 32, nine separate polyhedral reel assemblies 40 are positioned in an array. Each polyhedral reel 42 has a face 43 visible to the player. The base game 32 also has a plurality of pay lines 14*a-h*. In this example, the base game has eight different pay lines 14.

Figure 12:
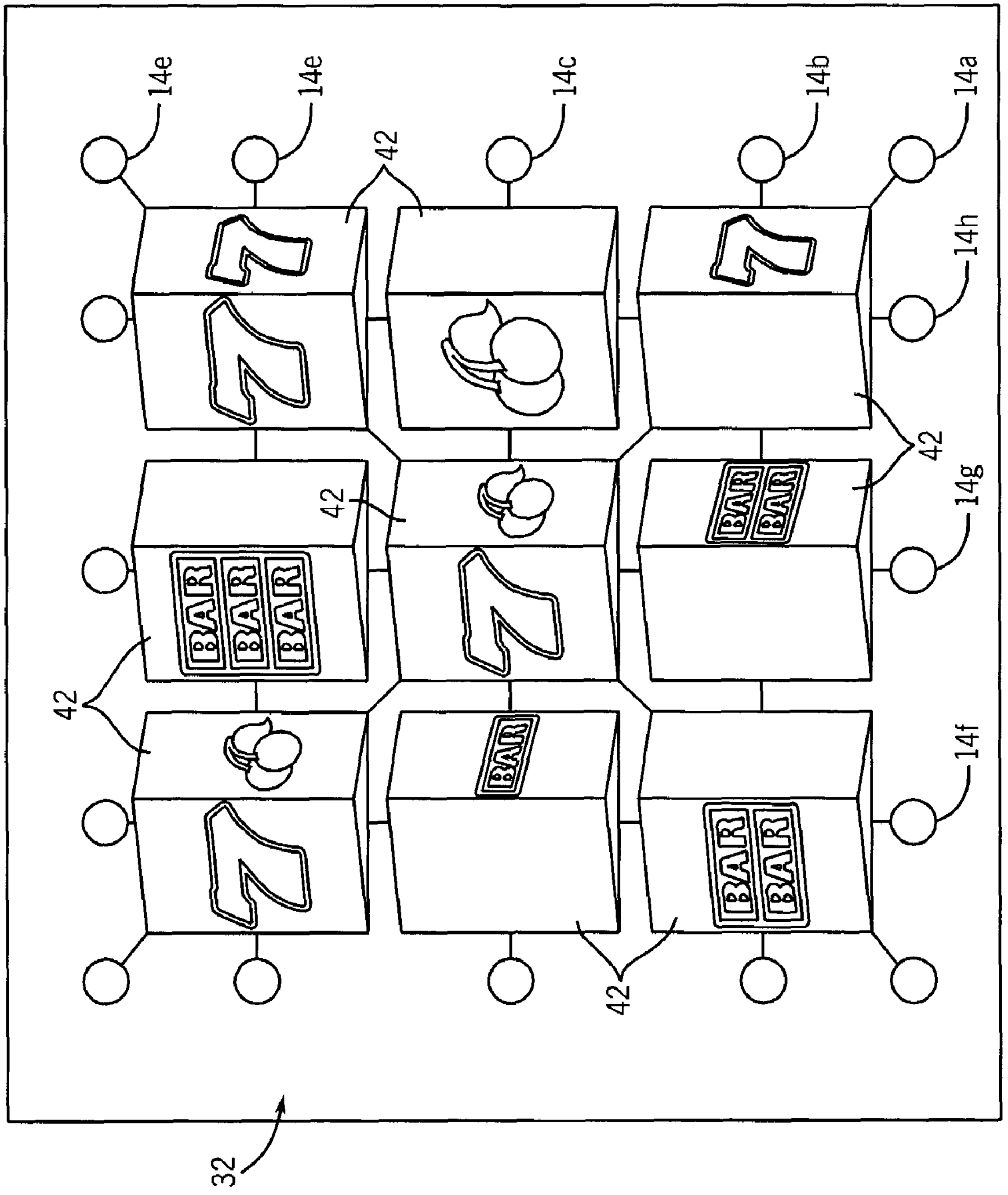
FIG. 12 is the game display of the gaming machine shown in FIG. 10 illustrated in a dynamic state.

FIG. 12 illustrates the spinning of the polyhedral reel assemblies 40 after a wager has been received from the player initiating the game. The rotational direction may be either horizontal or vertical. The array may have some polyhedral reel assemblies with a horizontal rotational direction, and other reel assemblies may have a vertical rotational direction.

With an ordinary mechanical slot machine, vertical pay lines such as 14*f-h* are not practically possible to implement because of the fixed order that the indicia are presented on a mechanical reel strip. The only way that a mechanical presentation of the indicia can practically create vertical pay lines is to use individual, independently controlled polyhedral reels in accordance with this invention.

Figure 13:
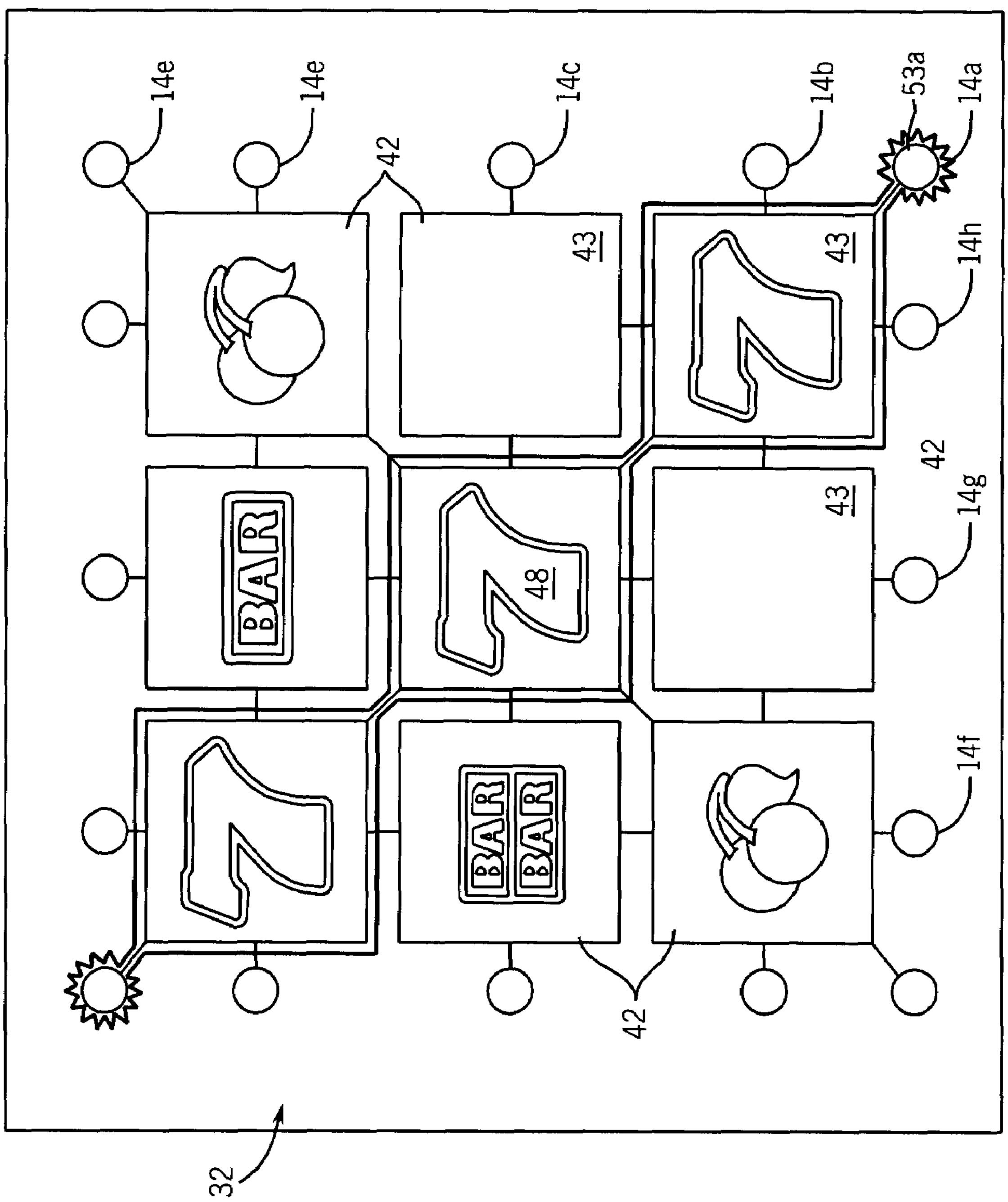
FIG. 13 is the game display of the gaming machine shown in FIG. 10 showing a game outcome.

FIG. 13 illustrates the game outcome with the polyhedral reels 42 in their stopped position. The game outcome can be randomly determined for the entire array or each reel outcome can be independently determined. FIG. 13 shows a winning game outcome on one of the pay lines.

Although the gaming machine 20 of FIG. 10 corresponds roughly to the placement of reel symbols in traditional gaming machines, the polyhedral reels used in the improved game display may be assembled in any geometric orientation to create a base or bonus game for a gaming machine.

Figure 14:
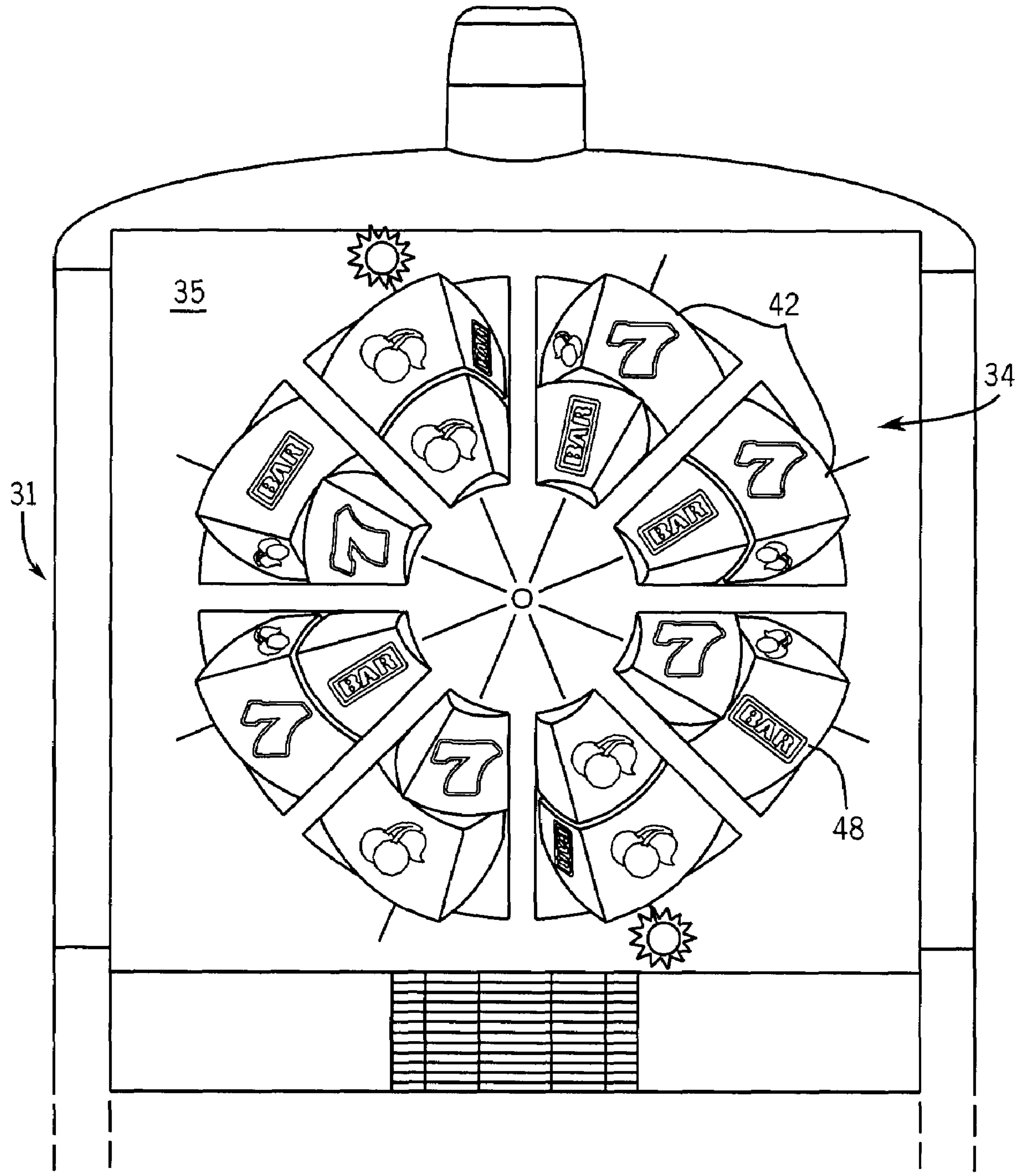
FIG. 14 is a gaming display having triangular polyhedral reels illustrated in a dynamic state.
Figure 15:
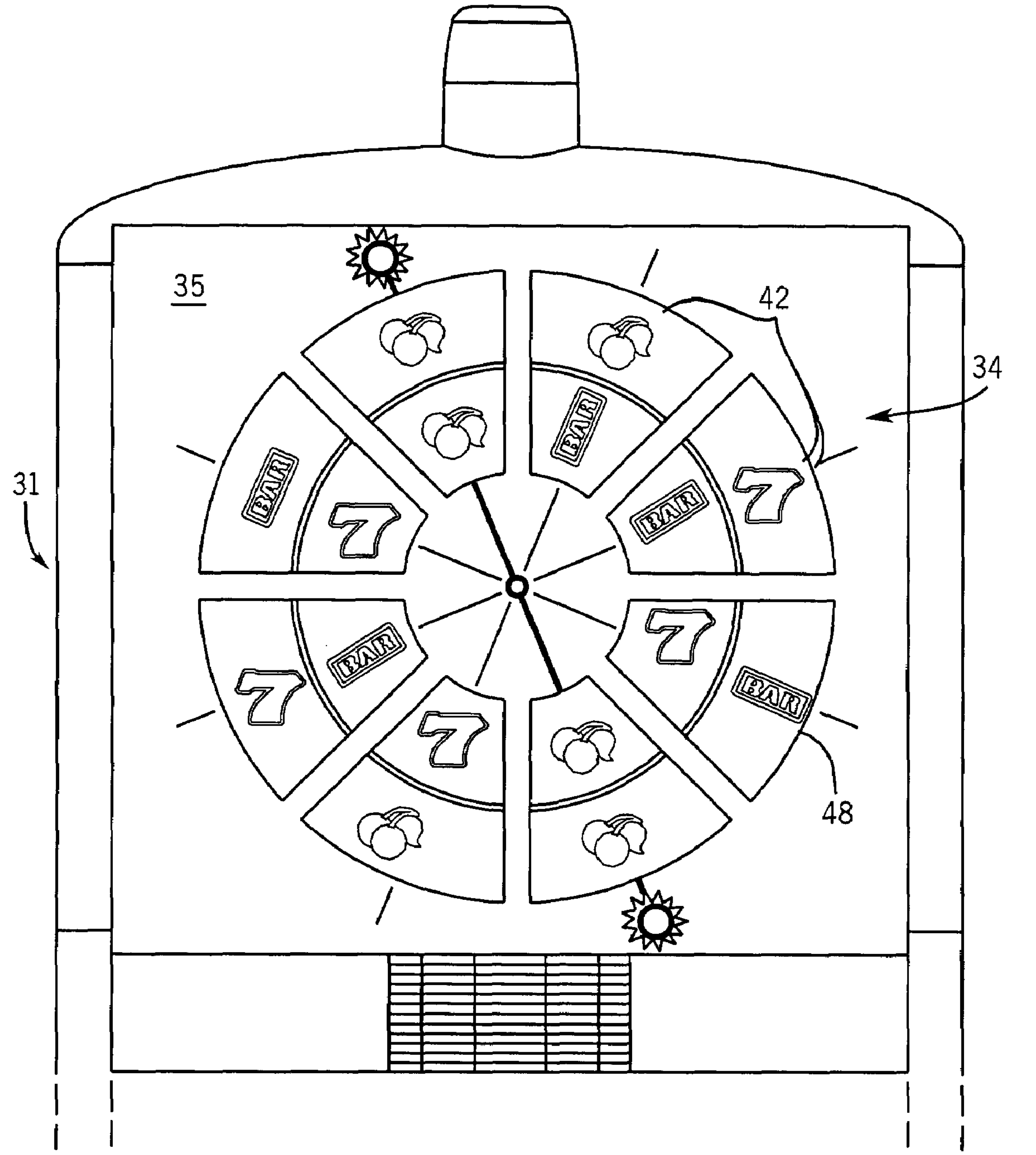
FIG. 15 is the game display of FIG. 14 illustrating a final game outcome.

FIG. 14 illustrates how multiple reel assemblies 40 can be combined to create a novel type of game display using a circular pattern. FIG. 14 illustrates the use of triangular polyhedral reels configured in a concentric circular array. Pay lines are formed along any two radial lines. As pictured in FIG. 10, the pay lines 14 are formed from four separate indicia 48. Each indicium depicted is on a separate polyhedral reel. Consequently, there are 16 separate and distinct polyhedral reels shown in FIG. 14. The concentric circular array, shown in FIG. 10, allows for at least 28 distinct pay lines. Additional pay lines can be formed using concentric circles around the inner and outer circumference of the circular array. FIG. 15 illustrates the final game outcome of the game displayed in FIG. 14. A winning pay line is shown. With the polyhedral reel assemblies 40, a circular slot machine can be practically produced, without requiring complicated gear train transmissions or other expensive to produce drive mechanisms.

Because each indicium displayed in the game outcome is driven by an independent reel, considerable game design flexibility is provided. For example, a player may decide to re-spin selected polyhedral reels while keeping all other reels stationary.

Selecting specific spinning reels can be accomplished easily using a transparent panel (e.g., a glass insert) to cover and protect the game. Overlaying the transparent panel may be a touch screen to enable the player to manually select one or more of a plurality of polyhedral reels that are to be re-spun to give a player another chance at a winning outcome.

Figure 7:
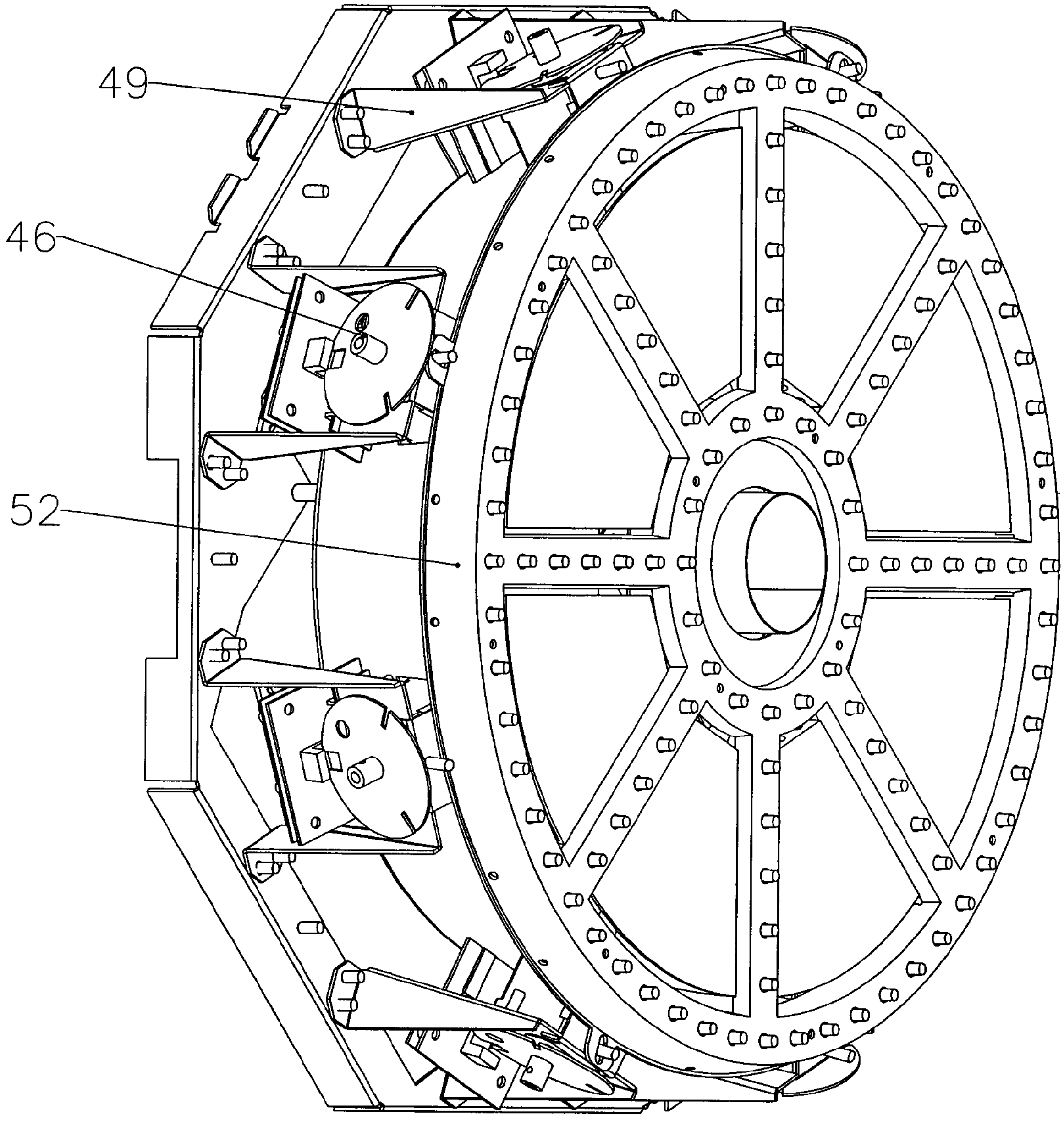
FIG. 7 is an isometric view of multiple polyhedral reel assemblies arranged together to form a polyhedral reel game assembly.
Figure 8:
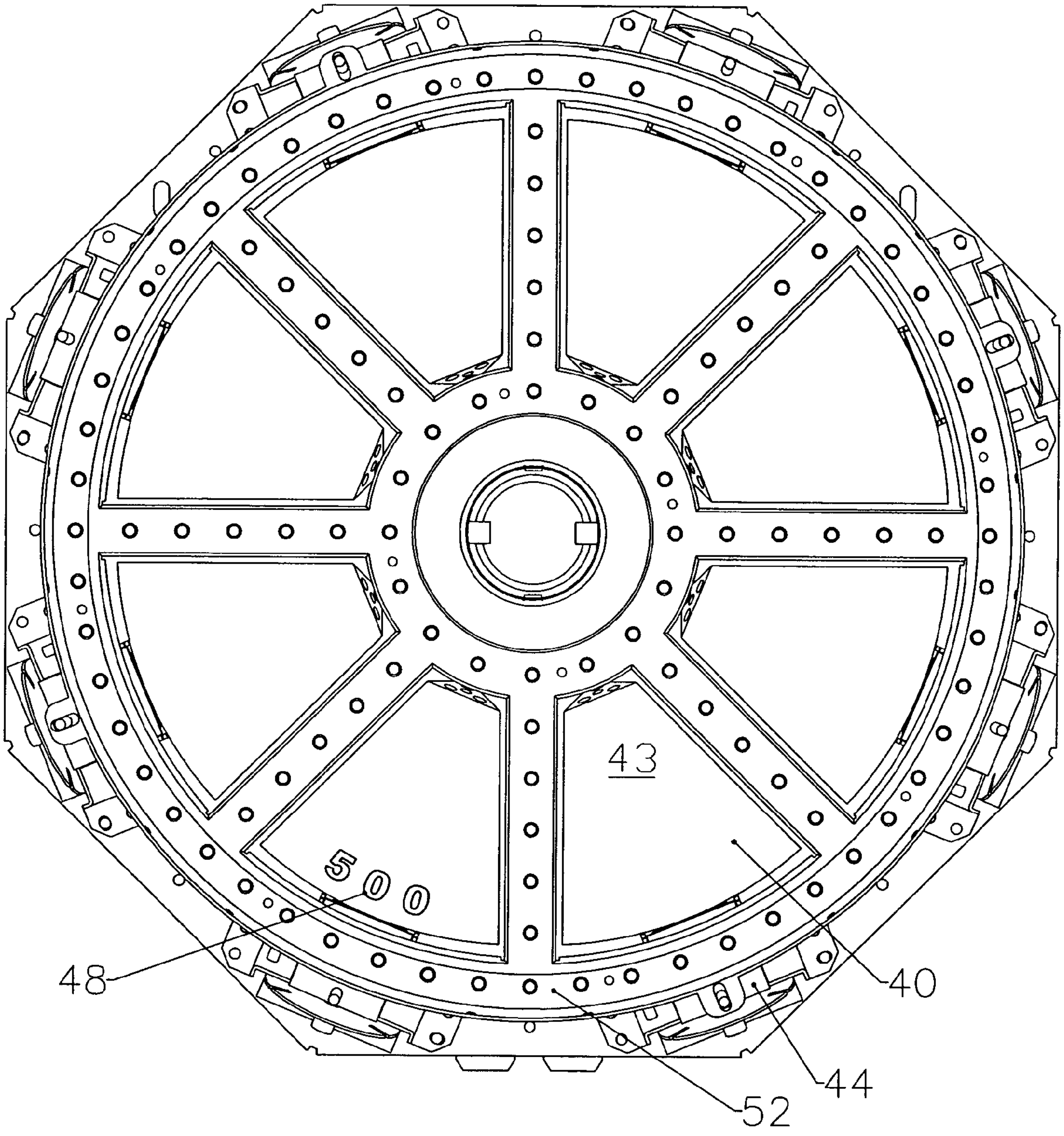
FIG. 8 is a front orthogonal view of the polyhedral reel game assembly shown in FIG. 7.
Figure 16:
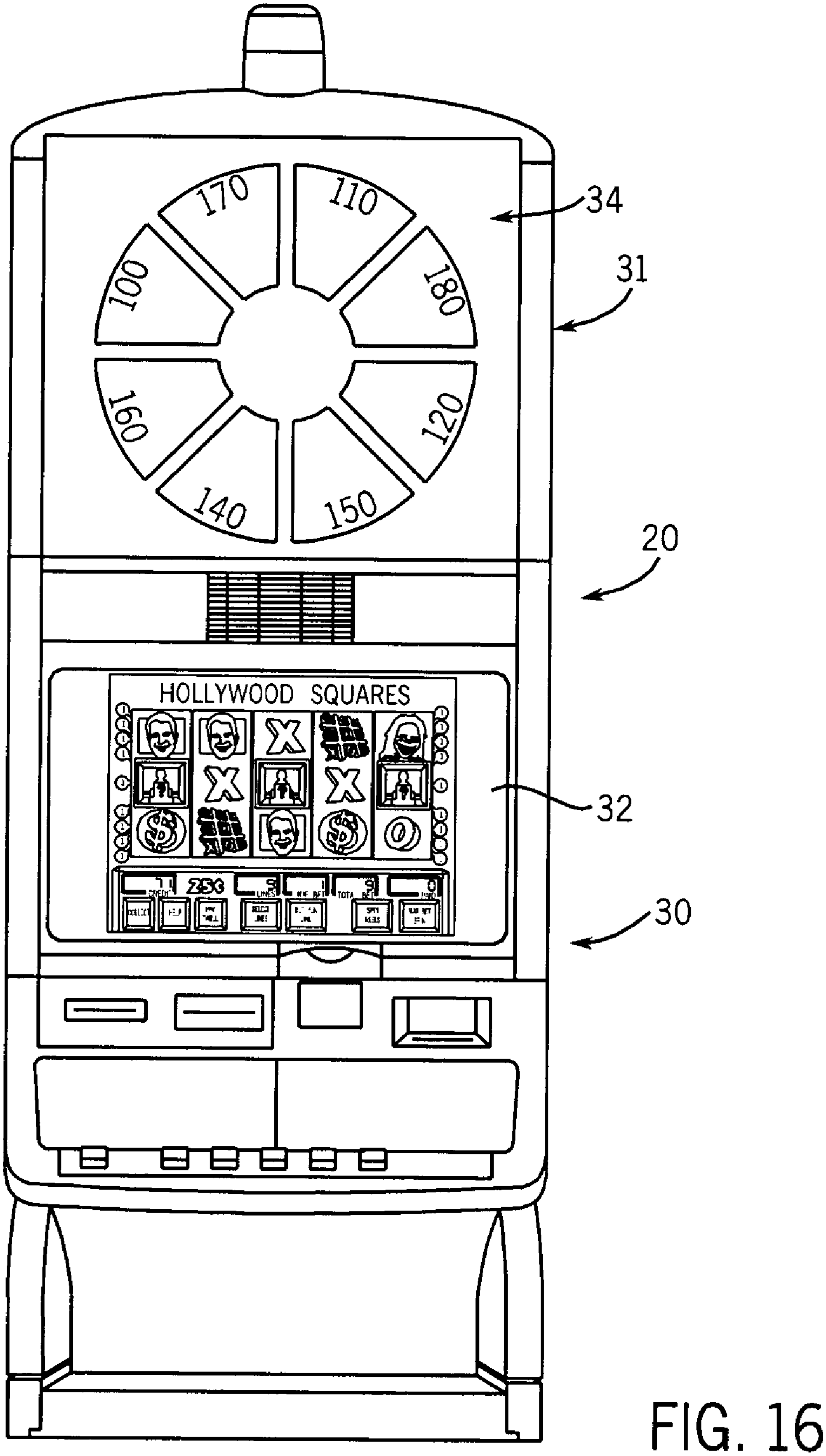
FIG. 16 is a front view of a gaming machine having a bonus game using the triangular polyhedral reel game assembly of FIG. 7.

In addition to using the polyhedral reels in a base game, the polyhedral reels can also be used in a bonus game. FIG. 16 illustrates how multiple reel assemblies 40 can be used to create a bonus game. In this example, a plurality of the reel assemblies 40 shown in FIG. 3 has been combined in a circular shape. FIG. 7 and FIG. 8 illustrate the circular reel assembly. The entire bonus game assembly shown in FIG. 7 may be mounted in a gaming machine 20 as shown in FIG. 16. FIG. 16 illustrates how indicia 48 may be displayed on each of the polyhedral faces 43. In this example, the indicia reflect credit amounts that can potentially be won. In the bonus game, the indicia may represent some type of award such as providing a credit award, a mathematical operator (e.g., multiplier), or other type of prize. Another way that the indicia can be used in the bonus game is to indicate some form of game progress or game development. This may include indicia that show free plays, wild symbols, extra choices, game terminators, player information, or any other informational descriptors regarding game play.

Figure 17:
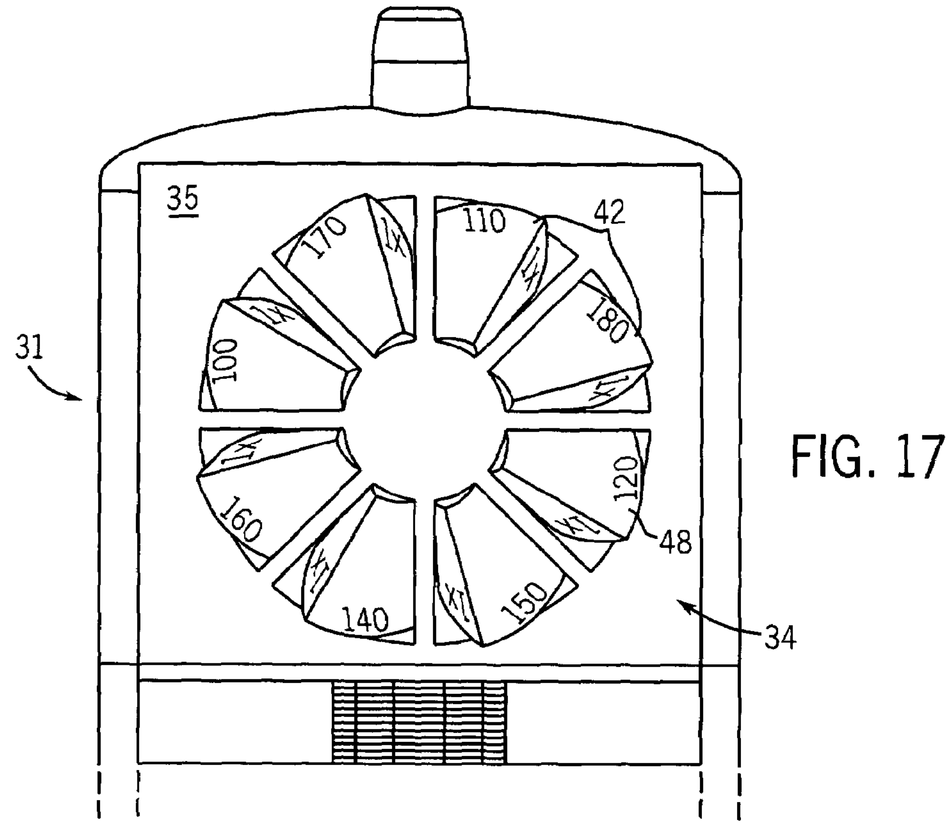
FIG. 17 is the bonus game shown in FIG. 16 illustrated in a dynamic state.
Figure 18:
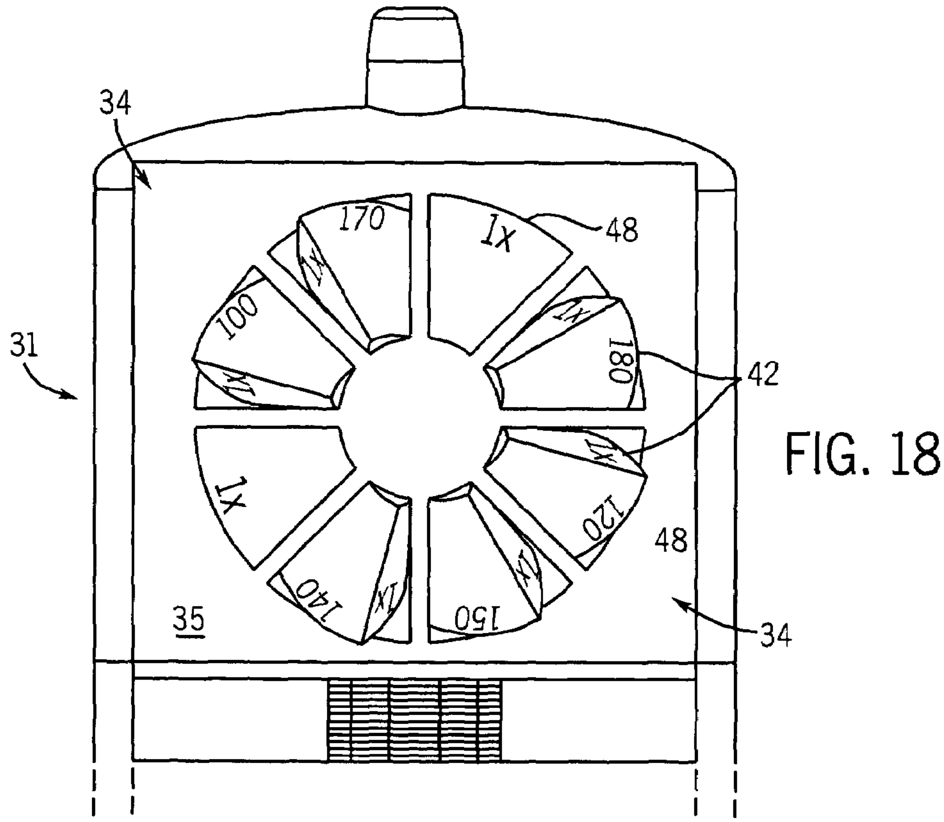
FIG. 18 is the bonus game shown in FIG. 16 in a partially dynamic state with some polyhedral reel assemblies stopped and displaying a final outcome.
Figure 19:
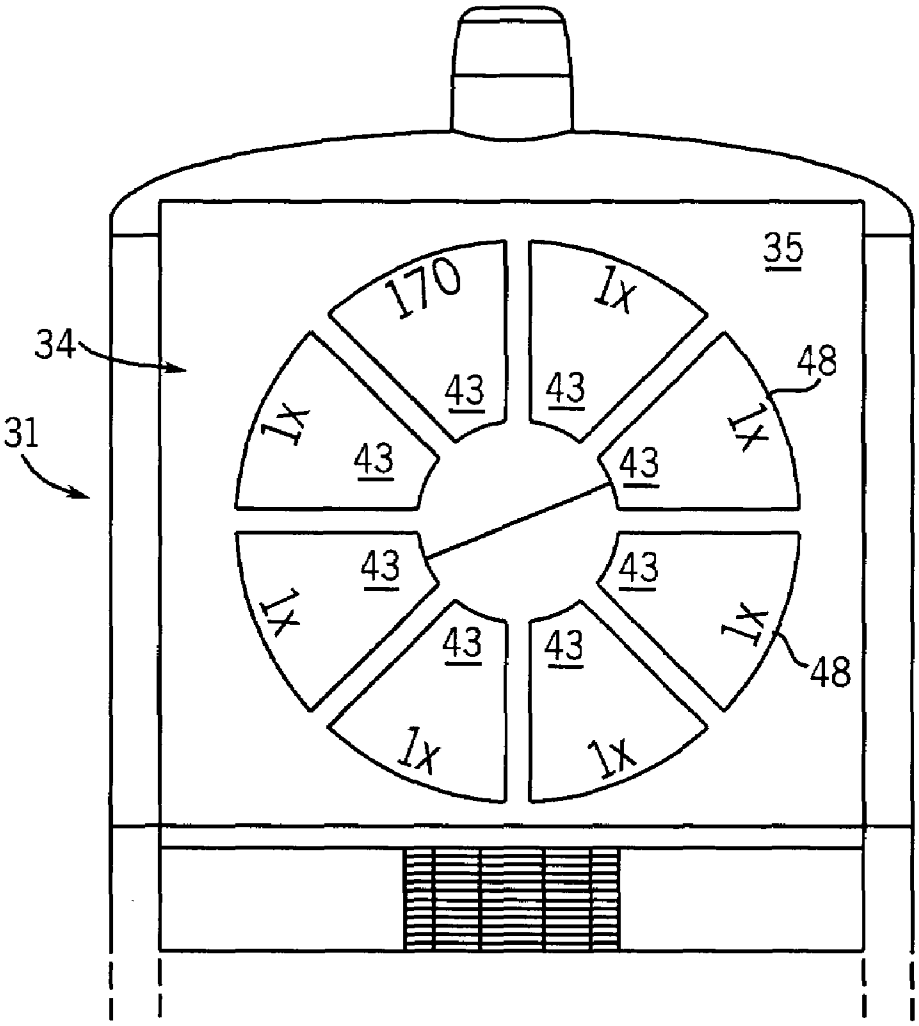
FIG. 19 is the bonus game shown in FIG. 16 with all polyhedral reel assemblies stopped and displaying a final game outcome.

FIG. 17 illustrates the rotational motion of each polyhedral reel. FIG. 18 illustrates some of the polyhedral reels stopped and in a final game outcome position while other reels are still in a dynamic state. FIG. 19 illustrates the final stopping position of all the polyhedral reels.

In the bonus game depicted in FIG. 19, all the credit amounts displayed are added together. All the multipliers displayed are multiplied together to determine the product of the multipliers (or bonus multiplier). The sum of the credits displayed is multiplied by the bonus multiplier. As displayed by FIG. 19, the player has 170 credits times a bonus multiplier of one or one hundred seventy credits. The polyhedral reels could have stopped at any number of other indicia to arrive at any number of other awards.

A variety of bonus and base games can be developed using these polyhedral reels. If desired a game outcome can be determined based on each of the individual reel outcomes taken collectively. These award outcomes may be determined based on the pay lines and pay tables, or the game outcome may be determined based on any number of other criteria.

The ability use polyhedral reels in a variety of geometrical arrays provides a flexible and powerful tool for game developers. The present invention can be incorporated into any variety of game themes. The polyhedral reels provide a dynamic display whose visual content can be varied to provide players with any number of different and entertaining game displays.

While the present invention has been described with reference to one or more particular embodiments, those skilled in the art will recognize that many changes may be made thereto without departing from the spirit and scope of the present invention. Each of these embodiments and obvious variations described above is contemplated as falling within the spirit and scope of the claimed invention, which is set forth in the following claims.

What is claimed is:

1. A gaming machine having an improved game display comprising:

a plurality of polyhedral reel assemblies arranged in a generally circular shape with each reel assembly having a polyhedral reel, each polyhedral reel being rotatable about an axis, the plurality of axes having at least two non-parallel axes, each polyhedral reel having a plurality of faces, and each face having an indicium;

a drive mechanism connected to the polyhedral reel assembly for rotating the polyhedral reel; and a central processing unit for determining a stopped position for the polyhedral reel, the central processing unit further for controlling the drive mechanism to position the polyhedral reel in the stopped position.

2. The gaming machine described in claim 1, wherein the rotating polyhedral reel is oscillating.

3. The gaming as described in claim 2, wherein the oscillation is reversed before the polyhedral reel makes a complete revolution.

4. The gaming machine as described in claim 1, wherein the drive mechanism is a stepper motor.

5. A gaming machine comprising:

a wager acceptor;

a plurality of polyhedral reel assemblies arranged in a generally circular shape with each reel assembly having a polyhedral reel, each polyhedral reel being rotatable about an axis, the plurality of axes having at least two non-parallel axes, each polyhedral reel having a plurality of faces, and each face having an indicium;

a drive mechanism connected to the polyhedral reel assembly for rotating the polyhedral reel; and a central processing unit for determining a game outcome, the game outcome determining a stopped position for the polyhedral reel, the central processing unit further for controlling the drive mechanism to position the polyhedral reel in the stopped position to display the game outcome, the central processing unit further for determining an award for a winning game outcome.

6. The gaming machine described in claim 5, wherein the rotating polyhedral reel oscillates.

7. The gaming machine as described in claim 5, wherein the drive mechanism is a stepper motor.

8. A method for providing an improved game display for a gaming machine comprising:

rotating a plurality of polyhedral reels with at least one stepper motor, the plurality of polyhedral reels arranged in a generally circular shape, each polyhedral reel having a rotatable axis, the plurality of axes having at least two non-parallel axes;

controlling the position of the polyhedral reel with a central processing unit in communication with the stepper motor;

determining a stopped position for the polyhedral reel with the central processing unit; and stopping the polyhedral reel at the stopped position.

9. The method described in claim 8, further comprising rotating the polyhedral reel in alternating directions before reaching the stopping position.

10. The method described in claim 9, wherein the rotational direction is alternated before the polyhedral reel completes a full revolution.

11. A method for providing a wagering game comprising:

placing a wager;

rotating a plurality of polyhedral reels with a plurality of stepper motors, the plurality of polyhedral reels arranged in a generally circular shape, each polyhedral reel being rotatable about an axis, the plurality of axes having at least two non-parallel axes, each polyhedral reel having a plurality of faces, and each face having an indicium;

controlling the position of the polyhedral reel with a central processing unit in communication with the stepper motor;

determining a game outcome with the central processing unit, the game outcome determining a stopped position for the polyhedral reel;

stopped the rotation of the polyhedral reel in the stopped position; and making an award for a winning game outcome.

12. A game machine comprising:

a plurality of polyhedral reels arranged in a generally circular shape, each polyhedral reel being rotatable about an axis, the plurality of axes having at least two non-parallel axes, each polyhedral reel having a plurality of faces, each face having an indicium;

a drive mechanism for rotating each of the plurality of polyhedral reels;

a plurality of pay lines formed from predetermined group of polyhedral reel selected from the plurality of polyhedral reels; and a central processing unit for determining a game outcome, the game outcome determining a stopped position for each of the plurality of polyhedral reels, the central processing unit further for positioning each of the plurality of polyhedral reels, the central processing unit further for positioning each of the plurality of polyhedral reels with the drive mechanism to the stopped position, the central processing unit further for making an award for a winning game outcome occurring on the at least one of the plurality of pay lines for which a wager was received.

13. A method for providing a wagering game comprising:

rotating a plurality of polyhedral reels arranged in a generally circular shape, each polyhedral reel being rotatable about an axis, the plurality of axes having at least two non-parallel axes, each of the plurality of polyhedral reels having a plurality of faces, each of the plurality of faces having an indicium;

creating pay lines from selected groups of polyhedral reels selected from the plurality of polyhedral reels;

placing a wager on at least one of the plurality of pay lines;

determining a game outcome with the central processing unit, the game outcome determining the stopped position for each of the plurality of polyhedral reels; stopping the rotation of each polyhedral reels to display the game outcome; and making an award for a winning game outcome occurring on the at least one pay line on which the wager was placed.

14. A method for providing a bonus game comprising:

rotating a plurality of polyhedral reels arranged in a generally circular shape, each polyhedral reel being rotatable about an axis, the plurality of axes having at least two non-parallel axes, each of the plurality of polyhedral reels having a plurality of faces, each of the plurality of faces having an indicium;

determining a game outcome with the central processing unit, the game outcome determining the stopped position for each of the plurality of polyhedral reels;

stopping the rotation of each polyhedral reel at the stopped position to display the game outcome; and making an award for a winning game outcome.

15. The method as described in claim 1, wherein the rotating of the plurality of polyhedral reels is an oscillating rotation.

16. The method as described in claim 14, wherein each polyhedral reel is sequentially stopped.

17. The method as described in claim 15, wherein the award is the sum of all credit values displayed on the stopped reels.

18. The method as described in claim 17, wherein the award is the sum of all the credit values displayed on the stopped reels multiplied by the product of each multiplier displayed on the stopped reels.

19. A gaming machine comprising:

a plurality of polyhedral reels arranged in a generally circular shape, each polyhedral reel being rotatable about an axis, the plurality of axes having at least two non-parallel axes, each polyhedral reel having a plurality of faces, each face having an indicium;

a drive mechanism for rotating each of the plurality of polyhedral reels;

a pay line formed from a predetermined group of polyhedral reels selected form the plurality of polyhedral reels;

a wager acceptor for receiving a wager on the pay line; and a central processing unit for determining a game outcome, the game outcome determining a stopped position for each of the plurality of polyhedral reels, with the drive mechanism to the stopped position determined for each of the plurality of polyhedral reels, the central processing unit further for making an award for a winning game outcome.

* * * * *